United States Patent [19]

Tannenbaum et al.

[11] Patent Number: 5,659,671
[45] Date of Patent: Aug. 19, 1997

[54] METHOD AND APPARATUS FOR SHADING GRAPHICAL IMAGES IN A DATA PROCESSING SYSTEM

[75] Inventors: David Conrad Tannenbaum, Hurley; Andrew David Bowen, Saugerties; Robert Spencer Horton, Hurley, all of N.Y.

[73] Assignee: International Business Machines Corporation, Armonk, N.Y.

[21] Appl. No.: 639,307

[22] Filed: Apr. 25, 1996

Related U.S. Application Data

[63] Continuation of Ser. No. 417,508, Apr. 4, 1995, abandoned, which is a continuation of Ser. No. 954,139, Sep. 30, 1992, abandoned.

[51] Int. Cl.$^6$ ................................................ G06F 15/00
[52] U.S. Cl. ................................... 395/126; 395/128
[58] Field of Search ......................... 395/126, 128, 395/129, 130, 131, 132

[56] References Cited

U.S. PATENT DOCUMENTS

| 4,862,391 | 8/1989 | Ohhashi | 395/126 |
| 4,943,938 | 7/1990 | Aoshima et al. | 395/122 |
| 5,369,737 | 11/1994 | Gholizadeh et al. | 395/126 |

*Primary Examiner*—Mark R. Powell
*Assistant Examiner*—Ba Huynh
*Attorney, Agent, or Firm*—Mark S. Walker; Barry J. Bumgardner; Andrew J. Dillon

[57] ABSTRACT

The present invention provides an apparatus for displaying an image of an object, as illuminated by a light source, on a display within a computer graphics display system. The image is graphically represented by a mesh of polygons and each polygon within the mesh has a surface defined by a set of vertices. The vertices define the surface of the polygon. The apparatus includes a processor, such as a rasterizer, that is responsive to each set of vertices for rendering each surface within the mesh of polygons in response to ambient lighting to produce a number of initially rendered surfaces within the mesh of polygons. Phong shading is utilized by the present invention. The processor produces a specular highlight contribution for each surface within the mesh of polygons utilizing a halfway vector, pointing from each surface to a direction halfway between a light vector and a vector pointing towards a viewpoint, associated with a vector normal to each surface. Diffuse color contributions are generated within the processor using a light vector from a surface pointing to an illumination source associated with a vector normal to each surface. The specular highlight contribution and the diffuse color contribution for each surface of the initially rendered surfaces are summed to produce finally rendered surfaces within the mesh of polygons. These finally rendered polygons are used to display the image within the computer graphics display system.

11 Claims, 6 Drawing Sheets

METHOD AND APPARATUS FOR SHADING GRAPHICAL IMAGES IN A DATA PROCESSING SYSTEM

This is a continuation of application Ser. No. 08/417,508, filed Apr. 4, 1995, abandoned, which is a continuation of application Ser. No. 07/954,139, filed Sep. 30, 1992, abandoned.

BACKGROUND OF THE INVENTION

1. Technical Field

The present invention relates to a method and apparatus for producing a graphical image and in particular to a method and apparatus for shading a graphical image displayed within a data processing system. More specifically, the present invention provides a method and apparatus for shading polygons displayed in a data processing system minimizing creating undesirable artifacts.

2. Description of the Related Art

Computer graphics display systems, e.g., CAD/CAM graphics work stations, are widely utilized to generate and display images of objects for scientific, engineering, manufacturing, and other applications. These computer graphics systems offer a range of visual effects, including graphic images nearing photographic quality. Many applications may not require a picture-perfect quality, but they do require accurate three-dimensional drawings of objects with shading and multiple light sources. In computer graphics display systems, surfaces of an object are usually represented by a polygon mesh. A polygon mesh is a collection of vertices, edges, and polygons. A mesh of polygons can come from many sources such as, an application, tesselated NURBS surfaces, spheres, cones, etc. The vertices are connected by edges, while the polygons may be thought of as a sequence of edges or of vertices.

Polygonal representation of objects is an artifact of image generation in a computer graphics system and is usually of no interest to viewers. To present a visual of an object on a video display which is more realistic in appearance than the corresponding polygon mesh, various procedures have been developed for removing hidden surfaces and shading and adding texture to visible surfaces in computer graphics systems. The efficiency of operations involving shading is critical to the performance of a computer graphics system since such an operation usually is performed for one million or more pixels per image.

Gouraud shading, also called "intensity interpolation shading" or "color interpolation shading", is a commonly used shading method in real-time systems to eliminate intensity discontinuities. A detailed explanation of Gouraud shading may be found in a text authored by Foley, Van Dam, Feiner, and Hughes entitled *Computer Graphics: Principles and Practice* published by Addison-Wesley Publishing Company (2d ed. 1990). Gouraud shading may be applied to individual polygons in a polygon mesh by interpolating polygon vertex illumination values that take into account the surface being approximated. This shading process requires that the normal vector be known for each vertex of the polygonal mesh. Alternatively, if the vertex normals are not stored with the mesh and cannot be determined directly from the actual surface, they may be approximated by averaging the surface normals of all the polygonal facets sharing each vertex.

Next, vertex intensities may be found utilizing the vertex normals with any desired illumination model. Finally, each polygon is shaded by linear interpolation of vertex intensities along each edge and then between edges. This method is popular for real-time systems because it produces images of acceptable quality with only one addition per pixel per color-band, but the shading creates undesirable artifacts.

For example, one artifact is the spreading of a spectral highlight occurring at a vertex throughout much of a polygon. Additionally spectral highlights within a polygon are totally missed if they do not in part land on a vertex. Other disturbing characteristics associated with Gouraud shading include the fact that moving objects tend to "flatten out" at certain viewing angles, surfaces appear dull or chalky, and images show pronounced Mach bands, exaggerations of intensity change at discontinuities.

Phong shading, also known as "normal-vector interpolation shading", is a better approach to shading that eliminates "flattening out" and dull surfaces and reduces Mach bands by interpolating the surface normal vector N, rather than the intensity. Bold characters and "→" are utilized to denote vectors. This approach involves interpolating normal vectors supplied at each vertex and applying a lighting equation at each point. More information on shading techniques such as Gouraud shading and Phong shading along with other principles of shading may be found in a text authored by Foley, Van Dam, Feiner, and Hughes entitled *Computer Graphics: Principles and Practice* published by Addison-Wesley Publishing Company (2d ed. 1990).

Figure 1:
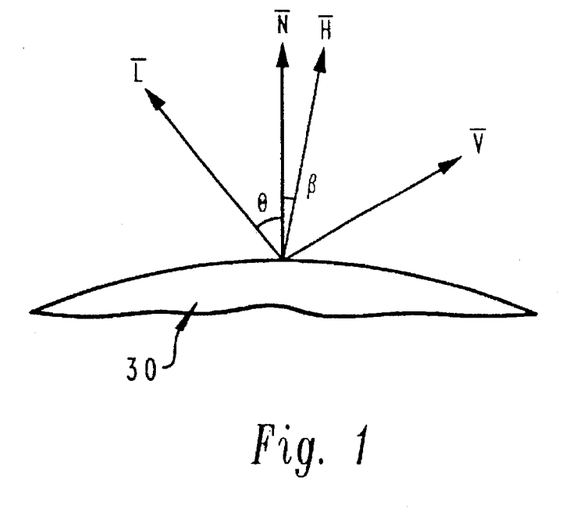
FIG. 1 depicts a diagram illustrating the geometry involved in an illumination model.

Referring now to FIG. 1, there is depicted a diagram illustrating the geometry involved in an illumination model. N is the vector normal to the surface of a displayed object 30, V is the view-point vector pointing towards viewer 32, L is the light source vector, and H is the "Halfway" vector or perfect specular vector reflection. $\theta$ is the angle of incidence and $\beta$ is the angle between H and N.

The following is a list of symbols and their definitions:

V is the vector pointing in the direction of the viewpoint.

N is the outward surface normal vector. This vector is interpolated over the triangle given its value at the three vertices.

H is the "halfway" vector or perfect specular-reflection vector. Like the normal vector, this vector is interpolated over the triangle. H=(L+V)/2.

$f_{att}$ the attenuation of light from the position of the eye to the position on the surface (usually about 1).

$I_{a\lambda}$ is the ambient light intensity as a function of wavelength $\lambda$, which is commonly allowed to take on the red, green, and blue wavelengths.

$I_{p\lambda j}$ is the intensity of point light source j as a function of $\lambda$.

j is a summation variable (sum over all light sources).

$k_{ar}$ is the ambient light reflection coefficient of the object.

$k_{sr}$ is the specular reflection coefficient of the object.

$k_{dr}$ is the diffuse reflection coefficient of the object.

L is the vector to the light source from the object (interpolated over the triangle).

$O_{d\lambda}$ is the diffuse color of the object.

$O_{s\lambda}$ is the specular color of object.

$\beta$ is the angle between vectors N and H (see FIG. 1).

$\theta$ is the angle between vectors N and L.

n is the specular highlight exponent. (usually=[1,128])

Note: "$\lambda$" implies three color components, red, green, and blue.

SUMMARY OF THE INVENTION

It is therefore one objective of the present invention to provide a method and apparatus for producing a graphical image.

It is another objective of the present invention to provide a method and apparatus for shading a graphical image displayed within a data processing system.

It is yet another objective of the present invention to provide a method and apparatus for shading polygons displayed in a data processing system minimizing undesirable artifacts.

The foregoing objectives are achieved as is now described. The present invention provides an apparatus for displaying an image of an object, as illuminated by one or more light sources, on a display within a computer graphics display system. The image is graphically represented by a mesh of polygons and each polygon within the mesh has a surface defined by a set of vertices. The vertices define the surface of the polygon. The apparatus includes a processor, such as a rasterizer, that is responsive to each set of vertices for rendering each surface within the mesh of polygons in response to ambient lighting to produce a number of initially rendered surfaces within the mesh of polygons.

The processor also produces a specular highlight contribution for each surface within the mesh of polygons utilizing a halfway vector, pointing from each surface to a direction halfway between a light vector and a vector pointing towards a viewpoint, associated with a vector normal to each surface. Diffuse color contributions are generated within the processor using a light vector from the surface pointing to an illumination source associated with a vector normal to the surface. The specular highlight contribution and the diffuse color contribution for each surface of the initially rendered surfaces are summed to produce finally rendered surfaces within the mesh of polygons. These finally rendered polygons are used to display the image within the computer graphics display system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
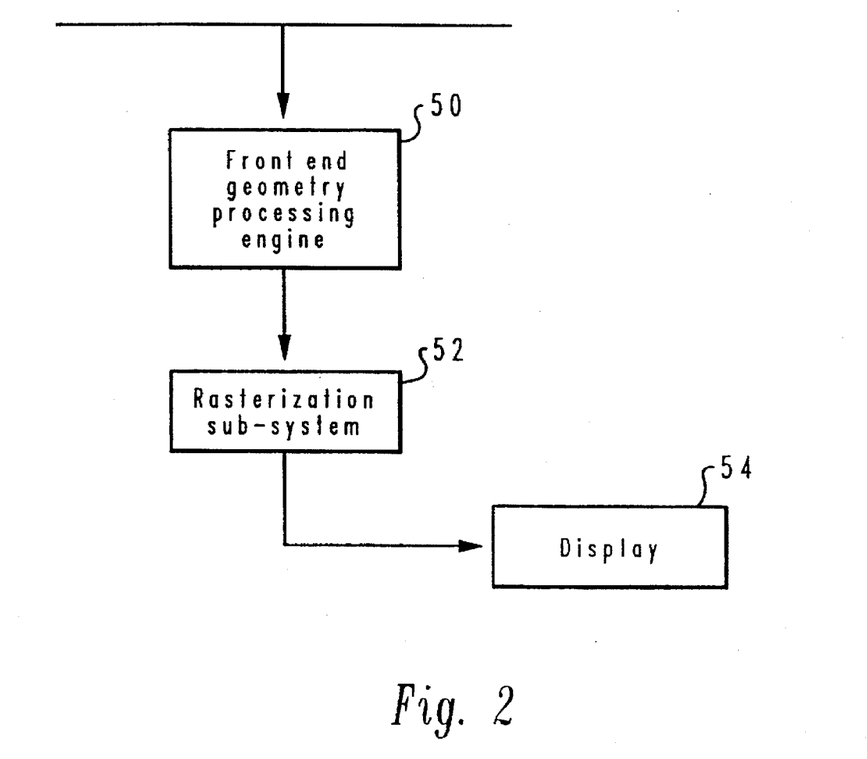
FIG. 2 is a simplified block diagram of a general system architecture of a rendering system in accordance with a preferred embodiment of present invention.

Referring now to FIG. 2, there is depicted a general system architecture of a rendering system in a computer graphics system in accordance with a preferred embodiment of the present invention. The architecture includes front end geometry processing engine 50, rasterization subsystem 52, and display 54. A preferred embodiment of the present invention may be implemented in rasterization subsystem 52.

Past rendering systems provided shading of polygons in which the color of interior pixels were computed by interpolating the color of the vertices. As mentioned before, this method may create many undesirable artifacts. A better approach to shading is to interpolate the normal vectors supplied at each vertex and apply a lighting equation at each point such as in the Phong shading approach. Interpolation of normal shading can immediately be recognized by the appearance of specular highlights within the interior of the interpolated polygon. Other visual cues include the lessening "zig zag" effects sometimes apparent along the edges of Gouraud shaded models. Gouraud shading is well known by those skilled in the art and has been implemented in software and hardware to run in real-time systems.

A general local lighting model includes both specular and diffuse lights. For a spotlight on an object, the diffuse component is often computed as, $k_{d}O_{d\lambda}(N \cdot L)$ where N is the normal vector of the surface at the point being lighted, and L is the vector to the light source being considered. The total diffuse light at the point is the sum over all (i) light sources. If there are "i" light sources:

$$k_{d}O_{d\lambda} \sum_{j=1}^{i} \vec{N} \cdot \vec{L}_{j}$$

The specular component depends on the normal, the position of the light source, and the position of the viewer. Phong illumination for non-perfect reflectors is:

$$I_{\lambda}=k_{sr}O_{s\lambda}(\vec{N} \cdot \vec{H})^{n}$$

Where $k_{sr}$ is the specular reflection coefficient, $O_{s\lambda}$ is the specular reflection color of the object, n is the specular-reflection exponent which controls the sharpness of the specular highlight, N is the normal vector, and H equals (L+V)/2 and is the "perfectly specular microfacet with respect to the eye position". It is evident that both a dot-product and an exponentiation function are required. A major draw back to Phong shading is that additional computations are required, for example, for interpolated normals, the vector must be normalized and a dot product taken for each picture element, greatly increasing the computation time involved.

In accordance with a preferred embodiment of the present invention, a novel system for computing the dot product term is provided. A frame-buffer memory, typically dedicated to color texture maps, is utilized as a look-up table for non-linear functions in accordance with a preferred embodiment of the present invention. Additionally, a feed back path is created such that the values read from the "texture map" memory may be utilized as input for further calculations.

Rasterizer modules within rasterization subsystem 52 may be microcoded and an ultrawide horizontal instruction word may be utilized to control the operation of the rasterizer modules during each cycle in accordance with a preferred embodiment of the present invention. Utilizing microcode allows for various functions in the rasterizer modules.

Input into the rasterization stage is a series of triangles specified by their vertices in accordance with a preferred embodiment of the present invention. Other polygonal shapes may be utilized other than triangles as illustrated in the depicted embodiment. Each triangle has a color, an X, Y, and Z coordinate and a normal vector specified for each vertex. Additional input utilized includes the position and color of each light source and the specular and diffuse reflection coefficients, diffuse object color and specular highlight color of the material and specular highlight exponent. Interpolating the angle between the normal vector and the light vector at each vertex (interpolating the dot-product) fails to produce intra-triangle specular highlights. Interpolating the color only was the previous standard.

Phong shading requires that the lighting equations be evaluated on a per pixel basis, $$I_\lambda = I_{a\lambda} k_{ar} O_{d\lambda} + \sum_{j=1}^{i} f_{att} p_{\lambda_j} [k_{dr} O_{d\lambda} \cos\theta_j + k_{sr} O_{s\lambda} \cos^n \beta_j]$$

In accordance with a preferred embodiment of the present invention three vectors, N, L and $H_j$ may be interpolated. This interpolation requires computing the normalization factor for each of the three vectors.

Figure 3:
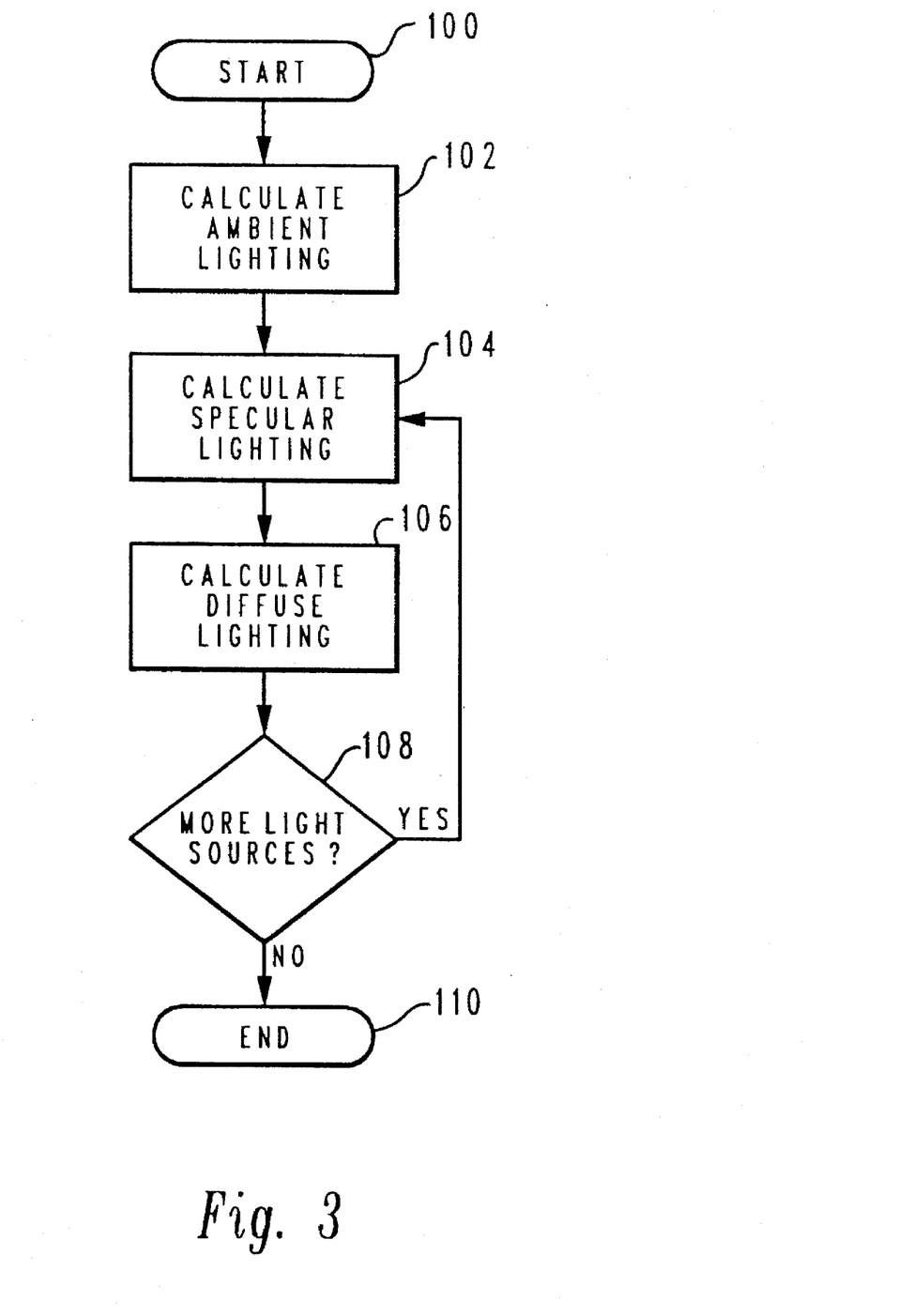
FIG. 3 depicts a high level logical flowchart for rendering an image in accordance with a preferred embodiment of the present invention.

With reference now to FIG. 3, there is depicted a high level logical flowchart for rendering an image in accordance with a preferred embodiment of the present invention. As illustrated the process begins in block 100 and thereafter proceeds to block 102, which depicts the calculation of the ambient lighting on the image. Afterward, the process proceeds to block 104, which illustrates the calculation of the specular lighting contribution from a light source on the image. The process then proceeds to block 106, which depicts the calculation of the effects of diffuse lighting by the light source on the image. Next, the process proceeds to block 108, which illustrates a determination of whether or not more light sources exist for the image. If more light sources exist for the image being rendered, the process returns to block 104 to calculate the effects of the next light source on the image. Otherwise, the process terminates as depicted in block 110.

Figure 4:
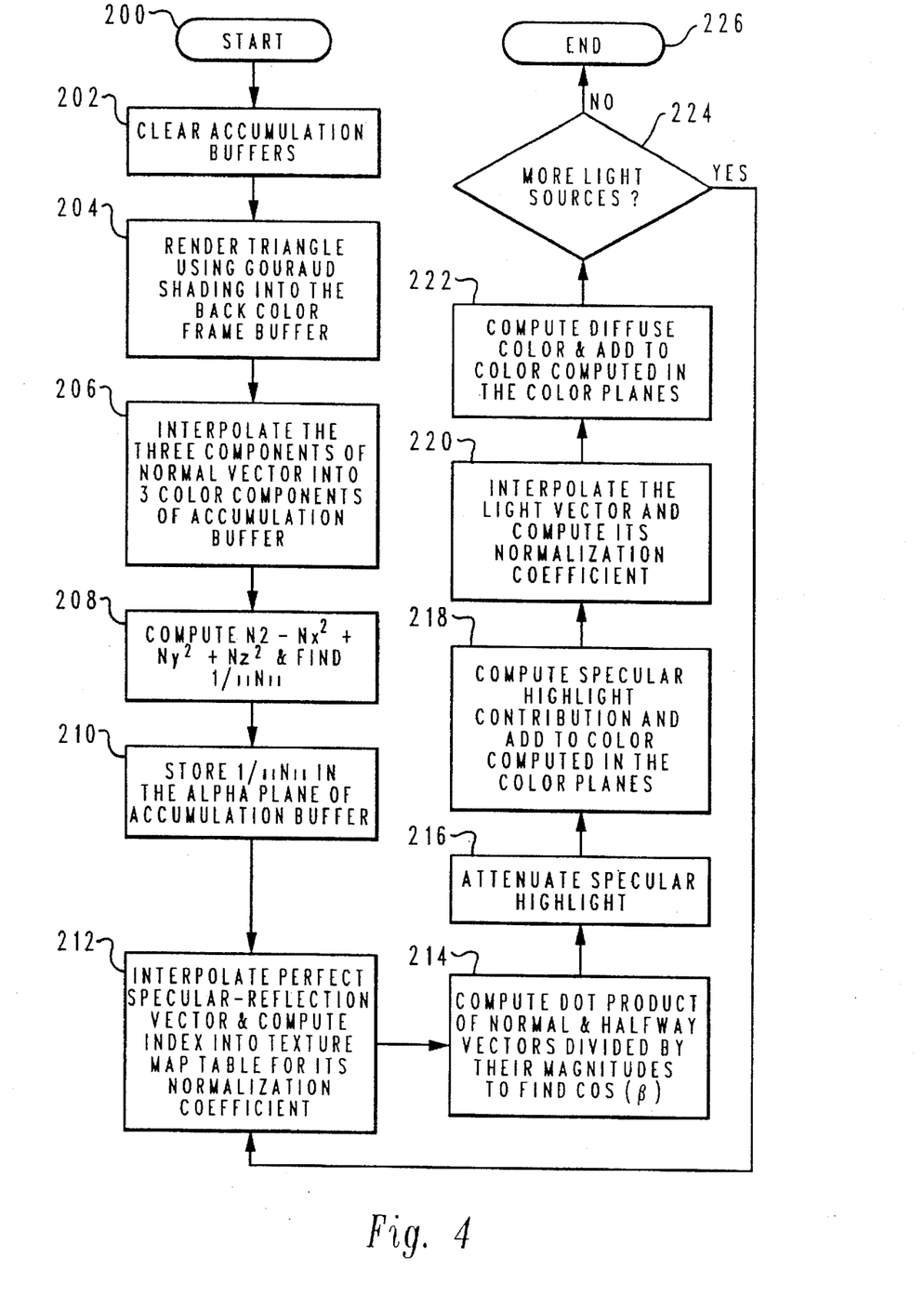
FIG. 4 is a logical flowchart for shading a triangle in accordance with a preferred embodiment of the present invention.

Referring now to FIG. 4, there is depicted a logical flowchart for shading a triangle in accordance with a preferred embodiment of the present invention. An image is rendered triangle by triangle in accordance with a preferred embodiment of the present invention.

Still referring to FIG. 4, the first portion of the process is utilized to calculate the ambient portion of the lighting. As illustrated, the process begins at block 200 and thereafter proceeds to block 202, which depicts the clearing of accumulation buffers for the red, green, blue, and alpha variables. Accumulation buffers are a set of memory in the frame buffer that are available for general purpose storage. The process then proceeds to block 204, which illustrates rendering the triangle utilizing Gouraud shading for the object color and the ambient light, $I_{a\lambda} k_{ar} O_{d\lambda}$, into the back color frame buffer. A back color frame buffer is one of two normally viewable frame buffers that is not being displayed. The product, $I_{a\lambda} k_{ar} O_{d\lambda}$, is computed in 50 (FIG. 2) and sent per vertex. This result forms the basis of the final result to which specular and diffuse highlights will be added.

Next, this portion of the process is employed to determine the specular portion of the lighting on the triangle. The process proceeds to block 206, which depicts the interpolation of the three components of the normal vector into three color components of the accumulation buffer. Block 208 depicts the computation of $N_x^2 + N_y^2 + N_z^2$ and utilizing this value as an input into a look-up table to determine the reciprocal square-root. Thereafter, the process proceeds to block 210, which illustrates the storing of the reciprocal square root, $1/\|N\|$ in the alpha plane of the accumulation buffer. Afterward, the process proceeds to block 212, which illustrates the interpolation of the perfect specular-reflection vector, $H_j$, and the computation of the index into the texture map table for $H_j$'s normalization coefficient.

Afterward, the process then proceeds to block 214, which depicts utilizing the values from block 212 to compute the dot-product of the normal and half vectors divided by their magnitudes to produce $\cos(\beta)$ as follows:

$$\cos(\beta) = \frac{N_x H_x + N_y H_y + N_z H_z}{\|\vec{M}\| \|\vec{H}\|}$$

Thereafter, the process proceeds to block 216, which depicts utilizing the value $\max(\cos(\beta), 0.0)$ as an input to a look-up table in a texture map located in the frame buffer for $\cos^n(\beta)$ to properly attenuate the specular highlight. Next, the process proceeds to block 218, which illustrates the computing of the specular highlight contribution, $k_{sr} O_{s\lambda} (N \cdot H_j)^n = k_{sr} O_{s\lambda} \cos^n(\beta_j)$, and the addition of this value to the color computed thus far in the color planes. Color planes are buffers of the frame buffer.

The process then proceeds to block 220, which illustrates the interpolation of the light vector and the computation of the light vectors normalization coefficient, $1/\|L\|$. The light vector's normalization coefficient is found utilizing the square of the light vectors components, $L_x^2 + L_y^2 + L_z^2$, and utilizing this value as an input into the lookup table for determining reciprocal square roots. The process then proceeds to block 222, which illustrates the computation of diffuse color as, $k_{dr} O_{d\lambda} (N \cdot L)$ and the addition of this value to the color computed thus far in the color planes.

Thereafter, the process proceeds to block 224, which illustrates a determination of whether or not more light sources exist. If more light sources exist, the process returns to block 212 for interpolation of the perfect specular-reflection vector $H_j$ corresponding to the next light source and computation of the index into the texture map for its normalization coefficient. If additional light sources do not exist for the triangle, the process terminates as illustrated in block 226.

This process may be utilized for each triangle within the polygonal mesh, resulting in shading of the entire object after all of the triangles in the polygonal have been shaded. Additionally, only selected triangles may be shaded to take into account situations, such as hidden surfaces, where shading all of the triangles in a mesh is unnecessary. This process may be implemented in a rasterizer in accordance with a preferred embodiment of the present invention.

Figure 5:
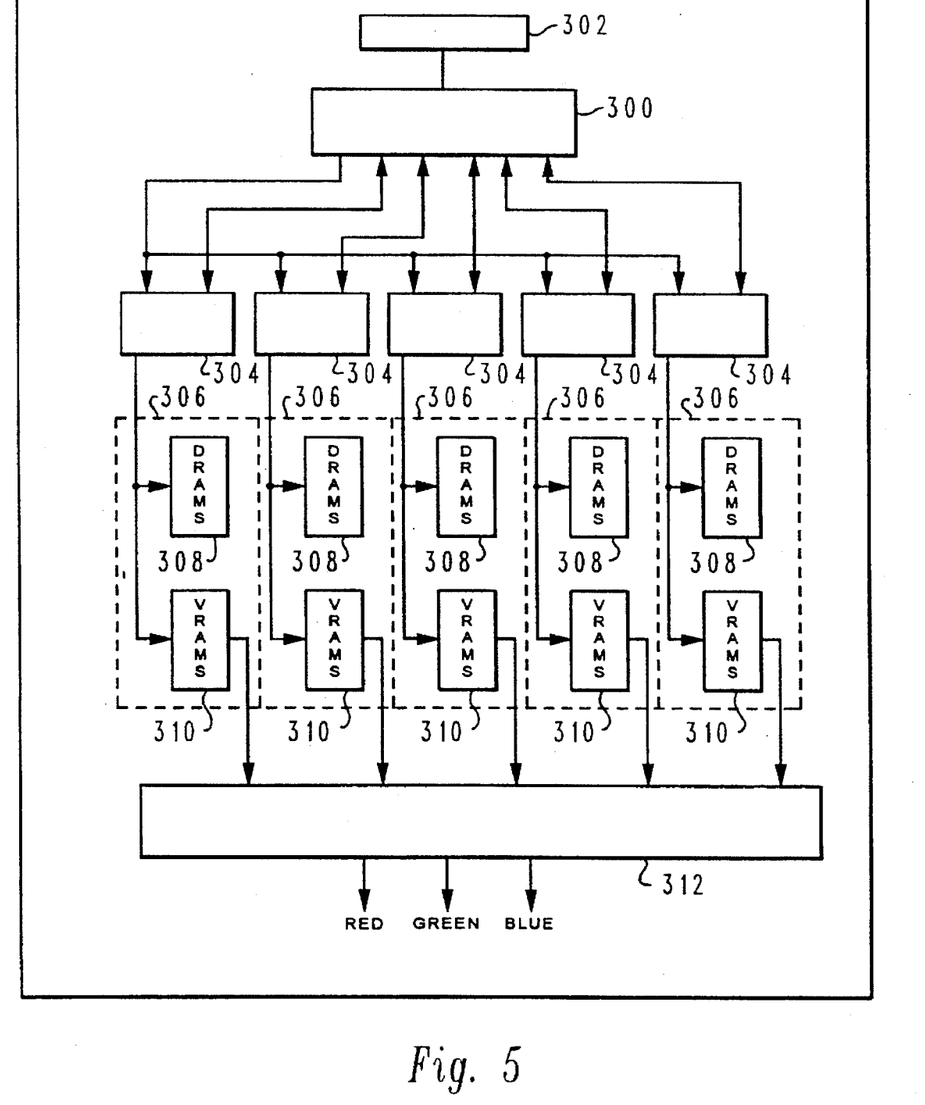
FIG. 5 depicts a rendering subsystem block diagram in accordance with a preferred embodiment of the present invention.

Referring now to FIG. 5, there is depicted a block diagram of a rendering subsystem in accordance with a preferred embodiment of the present invention. Bit block transfer (BLT) chip 300 receives data from graphics processor subsystem 302. BLT chip 300 allows the transfer of block data (i.e., an array of pixels) to the screen memory or from the screen memory. BLT chip 300 may copy one portion of screen memory to another portion of screen memory. BLT chip 300 sends data to rasterizers 304.

Rasterizers 304 are microcodable processors that may be programmed to perform a variety of functions including advanced shading algorithms such as Phong shading in accordance with a preferred embodiment of the present invention. These rasterizers may perform other functions such as producing Gouraud shaded triangles, interpolated lines, texture mapped triangles and so on. The output from rasterizers 304 enter frame buffers 306. Each frame buffer contains dynamic random access memory (DRAM) 308 and video random access memory (VRAM) 310. Each frame buffer may contain lookup tables and may be partitioned into accumulation buffers and color buffers among other uses well known to those skilled in the art. Frame buffers 306 are connected to random access memory digital to analog converter (RAMDAC) 312.

RAMDAC 312 converts the digital signals from frame buffers into analog signals for display on a video display terminal (not shown). RAMDAC 312 also contains random access memory (RAM) which may contain color tables.

In accordance with a preferred embodiment of the present invention, the rasterizer may be a high speed general purpose rasterizer having the capability to perform the complete rasterization process required for Gouraud shaded triangles, interpolated lines, texture mapped triangles and so on. Partial product computations required for Gouraud shading may be integrated into the rasterizer in accordance with a preferred embodiment of the present invention. Previously, such calculations were performed externally to the rasterizers and passed on as a set of parameters. In accordance with a preferred embodiment of the present invention, seven independent interpolators, X, Y, Z, R, G, B, and alpha exist for use for a variety of data other than their primary functions. The Phong shading algorithm takes advantage of the generality of the interpolators by employing them to interpolate vector components rather than color or coordinate values in accordance with a preferred embodiment of the present invention.

Other functions of the rasterizer include a texture mapping section containing logic for perspective correction and texture lookup. Additionally, a large section of pixel data (color, alpha, Z etc.) manipulation and modification logic exists within the rasterizer in accordance with a preferred embodiment of the present invention. VRAM memory controller logic may also be included within the rasterizer.

The rasterizer may be programmed via nanocode, which provides a means for taking data from a number of sources (frame buffer, BLT, interpolators, texture buffer, or internal registers) and merging these data in a variety of ways. In conjunction with picocode, used to control frame buffer accesses, also included in the rasterizer, a wide variety of advanced rendering functions may be provided. Basically, the nanocode specifies what modifications to make to the data and the picocode specifies which frame buffer resources to access. Further, flexibility may be provided by a small microcontroller which allows multiple cycle per-pixel operations to be sequenced through. That is, multiple nanowords to be executed for a given pixel. A nanoword is a line of nanocode executed in a cycle as sequenced through by the microcontroller. As a result, both simple and complex operations are possible.

Figure 6:
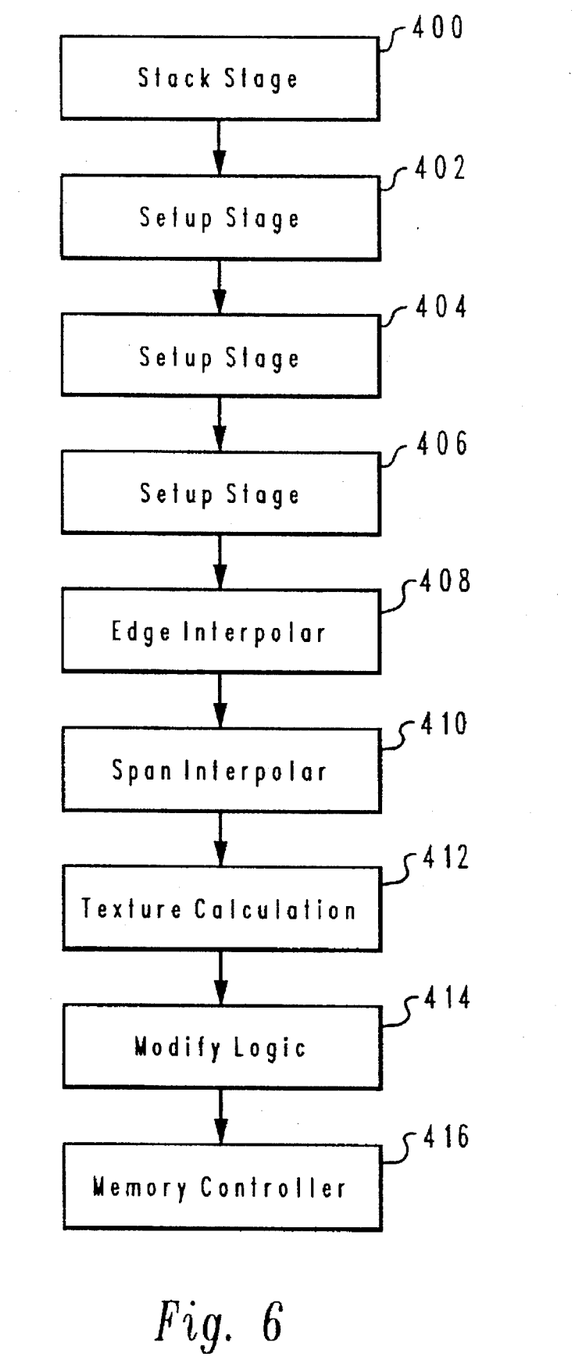
FIG. 6 is a block diagram of sections within a rasterizer in accordance with a preferred embodiment of the present invention.

Referring now to FIG. 6, there is depicted a block diagram of sections in a rasterizer in accordance with a preferred embodiment of the present invention. Stack stage 400 is employed to accumulate vertices of triangles in accordance with a preferred embodiment of the present invention. Setup stages 402, 404, and 406 are employed to provide initial calculations. Although three setup stages are depicted other numbers of setup stages may be implemented in accordance with a preferred embodiment of the present invention. For example, partial derivatives may be performed within these stages to determine component changes with respect to the x axis and the y axis.

Edge interpolator 408 is connected to set up stage 406 and interpolates or determines the edges of the triangle given the vertices. Span interpolator 410 is connected to edge interpolator 408 and is utilized to produce pixels along vertical intervals in accordance with a preferred embodiment of the present invention. Texture calculation stage 412 receives data from span interpolator 410 and is employed to create addresses for pixels in the texture space or texture map memory. Modify logic block 414 applies texture values from texture calculation stage 412 through vadous blending processes thereby computing the lighting. Memory controller 416 takes the resulting pixels from modify logic block 414 and places the pixels into the frame buffer.

Figure 7:
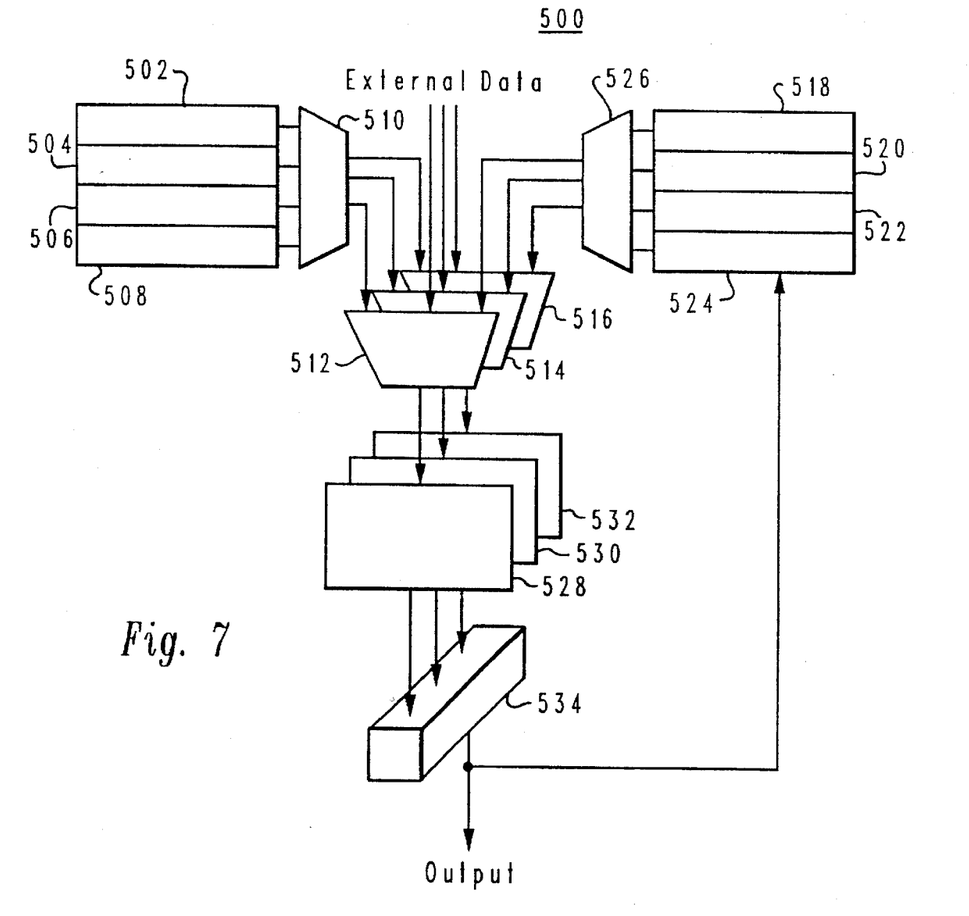
FIG. 7 depicts a block diagram of a modify logic unit within a rasterizer in accordance with a preferred embodiment of the present invention.

Referring now to FIG. 7, there is depicted a block diagram of a modify logic unit within a rasterizer in accordance with a preferred embodiment of the present invention. Modify logic unit 500 contains general purpose registers (GPR) 502, 504, 506, and 508. These registers are connected to multiplexer 510 which selects which general purpose registers to send to multiplexers 512, 514, and 516. Modify logic unit 500 also includes auxiliary registers (AUX) 518, 520, 522, and 524 which are connected to multiplexer 526.

This multiplexer 526 selects the input that will be directed to multiplexers 512, 514, and 516. These multiplexers in turn are connected to multipliers 528, 530, and 532 respectively. These three multipliers have their outputs connected to the input of adder 534 which produces an output that may be directed into the auxiliary registers. The three multipliers are usually utilized for computations in the R, G, and B color bands.

Modify logic unit 500 may be employed to compute dot products of vectors in one operation in accordance with a preferred embodiment of the present invention. Typically, the auxiliary registers constantly change from the feedback originating from the output of adder 534. The general purpose registers are typically constant.

In accordance with a preferred embodiment of the present invention, Phong shading uses Gouraud shading for ambient lighting and then provides specular highlights resulting from the light sources.

One advantage of the present invention is that the rasterizer provided may perform a wide range of processes, including dot products to provide rapid and high quality rendering of images.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the scope of the invention.

What is claimed is:

1. An apparatus for displaying an image of an object, being illuminated by at least one light source, on a display within a computer graphics display system, wherein said image is graphically represented by a mesh of polygons and wherein each polygon within said mesh has a surface defined by a set of vertices, said surface having a plurality of points, said apparatus comprising:

a frame buffer memory;

at least one table stored in said frame buffer memory, said at least one table containing values representing $s^n$, wherein s is a first normalized dot product and n is an exponential value, wherein said at least one table is used to determine a specular highlight contribution and a diffuse color contribution;

processor means responsive to each set of vertices defining a surface of a polygon within said mesh and responsive to ambient light for rendering a selected number of surfaces within said mesh of polygons to produce a plurality of initially rendered surfaces within said mesh of polygons;

specular highlight contribution means responsive to a halfway vector, within said processor means, said halfway vector pointing from a point on each surface to a direction halfway between a light vector and a vector pointing towards a viewpoint and being associated with a vector normal to a point on each surface, for producing a specular highlight contribution for said point on each surface within said mesh of polygons using said at least one table, said specular highlight contribution means including, means for determining a dot product of a halfway vector with a vector normal to a point on each surface;

means for dividing said dot product by the magnitude of said vector normal to said point on each surface multiplied by the magnitude of said halfway vector to produce a first normalized dot product; and means for retrieving $s^n$ from said at least one table in response to determining said first normalized dot product, wherein s and n are both utilized as parameters for determining $s^n$ from said at least one table; and means for multiplying $s^n$ by a specular reflection coefficient of said object and by a specular color of said object to produce said specular highlight contribution;

diffuse color contribution means, responsive to said light vector associated with a vector normal to said point on each surface, within said processor means, for producing a diffuse color contribution for said point on each surface within said mesh of polygons using said at least one table, said diffuse color contribution means including, means for determining a dot product of a light vector with a vector normal to a point on each surface;

means for dividing said dot product by the magnitude of said vector normal to each surface multiplied by the magnitude of said light vector to produce a second normalized dot product; and means for multiplying said second normalized dot product by a diffuse reflection coefficient of said object and by a diffuse color of said object to produce said diffuse color contribution;

summation means within said processor means for adding said specular highlight contribution and said diffuse color contribution for said point on each surface to said plurality of initially rendered surfaces to produce a plurality of finally rendered surfaces within said mesh of polygons, wherein said summation means is connected to said specular highlight contribution means and said diffuse color contribution means; and display means for displaying said image of said object within said computer graphics display system utilizing said plurality of finally rendered surfaces within said mesh of polygons.

2. The apparatus of claim 1, wherein said processor means utilizes Gouraud shading to render each surface within said mesh of polygons in response to ambient light.

3. The apparatus of claim 1, wherein said processor means is a rasterizer.

4. The apparatus of claim 3, wherein said specular highlight contribution and said diffuse color contribution are stored in a back color frame buffer.

5. A computer graphics system for displaying an image of an object, as illuminated by at least one light source, on a display within said computer graphics display system, wherein said image is graphically represented by a mesh of polygons and wherein each polygon within said mesh has a surface defined by a set of vertices, said surface having a plurality of points, said computer graphics system comprising:

a frame buffer memory;

at least one table stored in said frame buffer memory, said at least one table containing values representing $s^n$, wherein s is a first normalized dot product and n is an exponential value, wherein said at least one table is used to determine a specular highlight contribution and a diffuse color contribution;

processor means responsive to each set of vertices defining a surface of a polygon within said mesh and responsive to ambient light for rendering a selected number of surfaces within said mesh of polygons to produce a plurality of initially rendered surfaces within said mesh of polygons;

specular highlight contribution means responsive to a halfway vector, within said processor means, said halfway vector pointing from a point on each surface to a direction halfway between a light vector and a vector pointing towards a viewpoint and being associated with a vector normal to a point on each surface, for producing a specular highlight contribution for said point on each surface within said mesh of polygons using said at least one table, said specular highlight contribution means including, means for determining a dot product of a halfway vector with a vector normal to a point on each surface;

means for dividing said dot product by the magnitude of said vector normal to said point on each surface multiplied by the magnitude of said halfway vector to produce a first normalized dot product; and means for retrieving $s^n$ from said at least one table in response to determining said first normalized dot product, wherein s and n are both utilized as parameters for determining $s^n$ from said at least one table; and means for multiplying $s^n$ by a specular reflection coefficient of said object and by a specular color of said object to produce said specular highlight contribution;

diffuse color contribution means, responsive to said light vector associated with a vector normal to said point on each surface, within said processor means, for producing a diffuse color contribution for said point on each surface within said mesh of polygons using said at least one table, said diffuse color contribution means including, means for determining a dot product of a light vector with a vector normal to a point on each surface;

means for dividing said dot product by the magnitude of said vector normal to each surface multiplied by the magnitude of said light vector to produce a second normalized dot product; and means for multiplying said second normalized dot product by a diffuse reflection coefficient of said object and by a diffuse color of said object to produce said diffuse color contribution;

summation means within said processor means for adding said specular highlight contribution and said diffuse color contribution for said point on each surface to said plurality of initially rendered surfaces to produce a plurality of finally rendered surfaces within said mesh of polygons, wherein said summation means is connected to said specular highlight contribution means and said diffuse color contribution means; and display means for displaying said image of said object within said computer graphics display system utilizing said plurality of finally rendered surfaces within said mesh of polygons.

6. The computer graphics system of claim 5, wherein said processor means utilizes Gouraud shading to render each surface within said mesh of polygons in response to ambient light.

7. The computer graphics system of claim 5, wherein said processor means is a rasterizer.

8. The computer graphics system of claim 7, wherein said specular highlight contribution and said diffuse color contribution are stored in a back frame buffer.

9. A method for displaying an image of an object, as illuminated by at least one light source, on a display within a computer graphics display system, wherein said image is graphically represented by a mesh of polygons and wherein each polygon within said mesh has a surface defined by a set of vertices said surface having a plurality of points, wherein said computer graphics system includes a frame buffer memory, said method comprising:

storing at least one table in said frame buffer memory, wherein said at least one table is used to determine a specular highlight contribution and a diffuse color contribution;

at least one table stored in said frame buffer memory, said at least one table containing values representing $s^n$, wherein s is a first normalized dot product and n is an exponential value, wherein said at least one table is used to determine a specular highlight contribution and a diffuse color contribution;

initially rendering a selected number of surfaces within said mesh of polygons in response to ambient lighting to produce a plurality of initially rendered surfaces within said mesh of polygons in response to a signal containing vertices, said vertices defining a surface of a polygon within said mesh;

producing a specular highlight contribution for a point on each surface within said mesh of polygons using said at least one table in response to a signal including a halfway vector, pointing from said point on each surface to a direction halfway between a light vector and a vector pointing towards a viewpoint and being associated with a vector normal to the point on each surface, said step of producing a specular highlight contribution, determining a dot product of a halfway vector with a vector normal to a point on each surface;

dividing said dot product by the magnitude of said vector normal to said point on each surface multiplied by the magnitude of said halfway vector to produce a first normalized dot product; and retrieving $s^n$ from said at least one table in response to determining said first normalized dot product, wherein s and n are both utilized as parameters for determining $s^n$ from said at least one table; and multiplying $s^n$ by a specular reflection coefficient of said object and by a specular color of said object to produce said specular highlight contribution;

producing a diffuse color contribution for each surface within said mesh of polygons using said at least one table in response to a signal including a light vector associated with a vector normal to a point on each surface for producing a diffuse color contribution for a point on each surface within said mesh of polygons, said step of producing a diffuse color contribution including, determining a dot product of a light vector with a vector normal to a point on each surface;

dividing said dot product by the magnitude of said vector normal to each surface multiplied by the magnitude of said light vector to produce a second normalized dot product; and multiplying said second normalized dot product by a diffuse reflection coefficient of said object and by a diffuse color of said object to produce said diffuse color contribution;

generating an output signal including finally rendered surfaces from said initially rendered surfaces by adding said specular highlight contribution and said diffuse color contribution for each surface to each initially rendered surface; and displaying said image of said object within said computer graphics display system in response to said output signal including finally rendered surfaces within said mesh of polygons.

10. The apparatus of claim 1, wherein specular highlight contribution produced by said specular highlight means and said diffuse color contribution produced by said diffuse color contribution means are stored within said frame buffer memory, and wherein said summation means is connected to said specular highlight contribution means and said diffuse color contribution means via said frame buffer memory.

11. The apparatus of claim 5, wherein specular highlight contribution produced by said specular highlight means and said diffuse color contribution produced by said diffuse color contribution means are stored within said frame buffer memory, and wherein said summation means is connected to said specular highlight contribution means and said diffuse color contribution means via said frame buffer memory.

* * * * *